United States Patent [19]

Goode

[11] 4,451,117

[45] May 29, 1984

[54] DIGITAL WATCH MAGNIFYING ELEMENT

[76] Inventor: Robert C. Goode, R.D. #1, Box 42, West Sand Lake, N.Y. 12196

[21] Appl. No.: 548,635

[22] Filed: Nov. 4, 1983

[51] Int. Cl.[3] ........................ G02B 27/02; G04B 47/00

[52] U.S. Cl. .................................. 350/114; D10/132; 350/243; 368/283

[58] Field of Search ...................... D10/123, 128, 132; 350/114, 243; 368/27, 228, 278, 283

[56] References Cited

U.S. PATENT DOCUMENTS 2,107,720 2/1938 Swander ............................ 350/114

2,206,437 7/1940 Tracy ................................. 350/114

2,679,785 6/1954 Batt .................................... 350/243

3,316,709 5/1967 Edwards ............................ D10/132

4,012,127 3/1977 Bolander ............................ 350/114

*Primary Examiner*—Bruce Y. Arnold

*Assistant Examiner*—William Propp

*Attorney, Agent, or Firm*—Walter F. Wessendorf, Jr.

[57] ABSTRACT

Disclosed is a magnifying element for use with a digital watch face to magnify the numerals and hence facilitate the reading of the time thereby. The magnifying element has a face side and an adhesive coated side which is covered by tear strip whose removal exposes the adhesive side. Appropriate manipulative pressure applied to the face side of the magnifying element results in the adhesive coated side being attached to the digital watch face.

1 Claim, 1 Drawing Figure

DIGITAL WATCH MAGNIFYING ELEMENT

BACKGROUND OF THE INVENTION

1. Technical Field

This invention relates to a transparent magnifying element for use with a digital watch to facilitate reading the time.

2. Background

The object of this invention is to provide a magnifying element which can be easily attached to the face of a digital watch to facilitate reading the numerals and hence the time.

SUMMARY OF THE INVENTION

In accordance with the invention, there is provided a transparent magnifying element, one side of which is adhesive coated and covered by a tear strip. In operative use, the tear strip is simply removed to expose the adhesive coated side which is pressure applied directly to the face of a digital watch.

BRIEF DESCRIPTION OF THE DRAWINGS

This object and other objects of the invention should be discerned and appreciated from the detailed description taken in conjunction with the drawings in which the drawing figure shows the magnifying element preparatory to its being applied to the face of the digital watch and as so applied to the face of such digital watch.

DESCRIPTION OF THE PREFERRED EMBODIMENT

Figure 1:
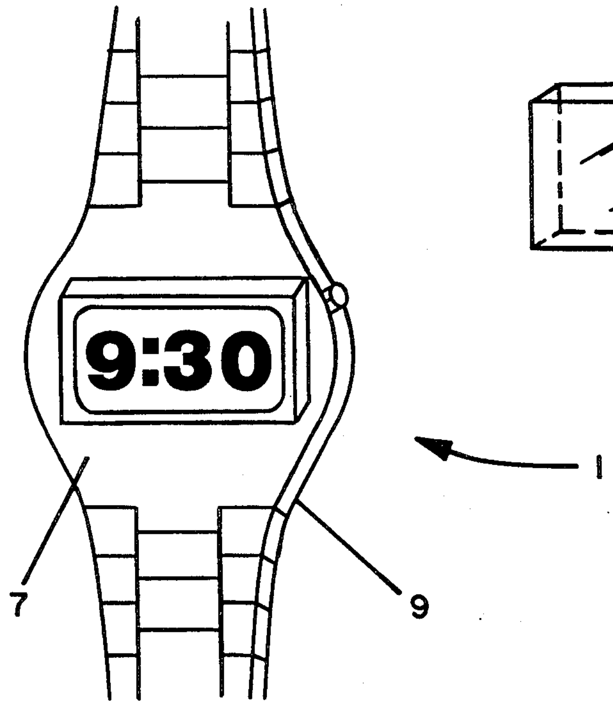
Figure 2:
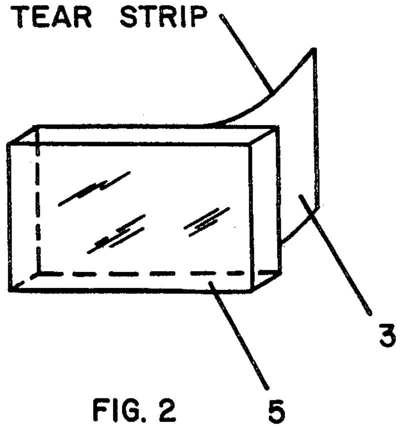

In the drawing FIGURE, reference numeral 1 generally refers to the invention of the transparent magnifying element. Magnifying element 1 is transparent. One side of flat magnifying element is adhesive coated and appropriately covered by a tear strip 3. Such tear strip is simply removed to expose the adhesive coated side of the magnifying element 1 with appropriate manipulative pressure being applied to the face side 5 of magnifying element 1 to affix same to the flat face 7 of the digital watch 9.

Magnifying element 1, so applied to the digital watch 9, magnifies the numerals to facilitate one's thereby reading the time.

Having thusly described my invention I claim:

1. A magnifying element for use with a digital watch having a face to magnify the numerals of such watch to facilitate reading the time thereby, said magnifying element having a face side and an adhesive coated side, said adhesive coated side having a tear strip removable to expose said adhesive coated side, said adhesive coated side of said magnifying element being affixed to said digital watch face by appropriate manipulative pressure applied to said face side of said magnifying element.

* * * * *